UNITED STATES PATENT OFFICE.

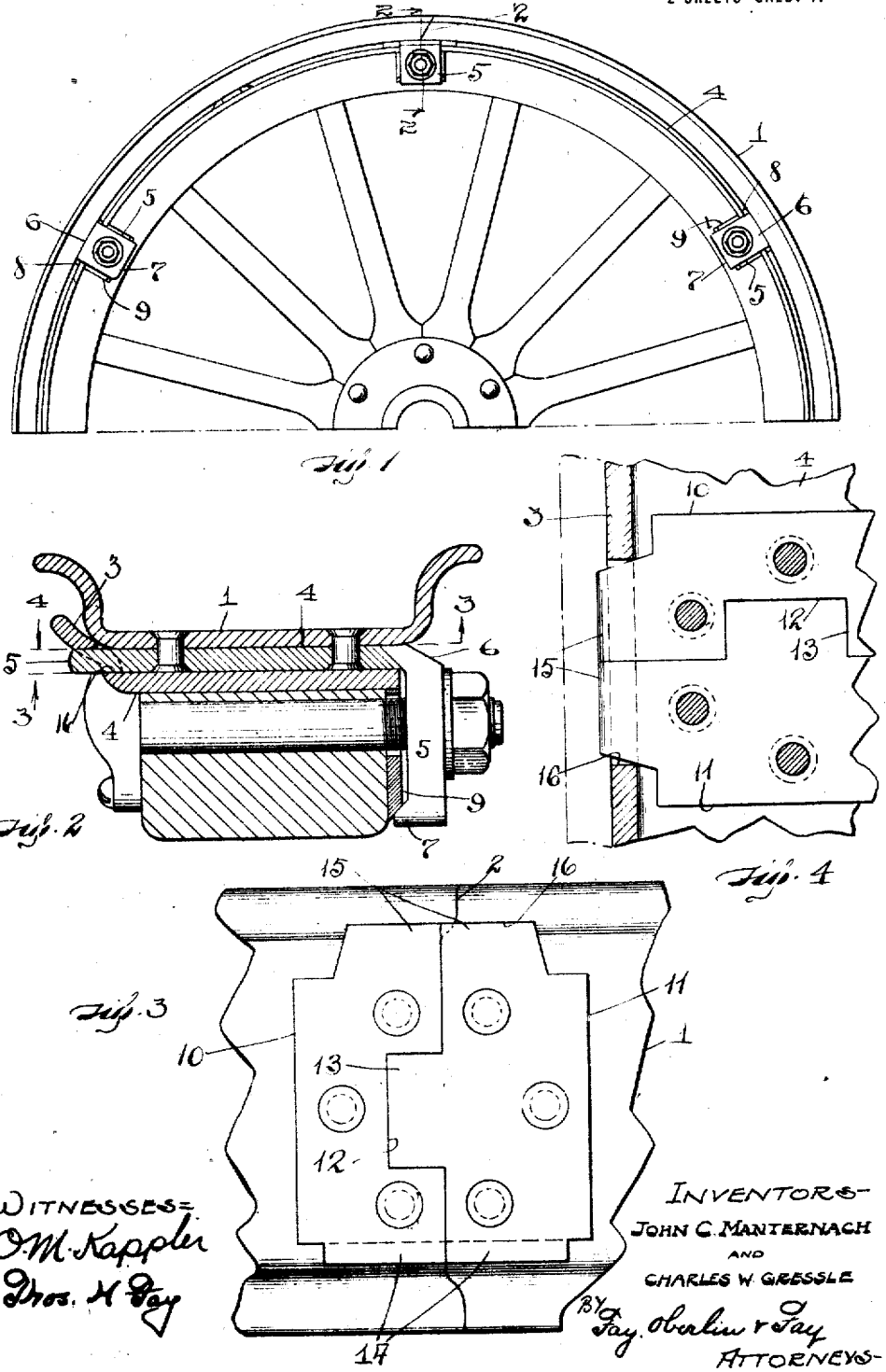

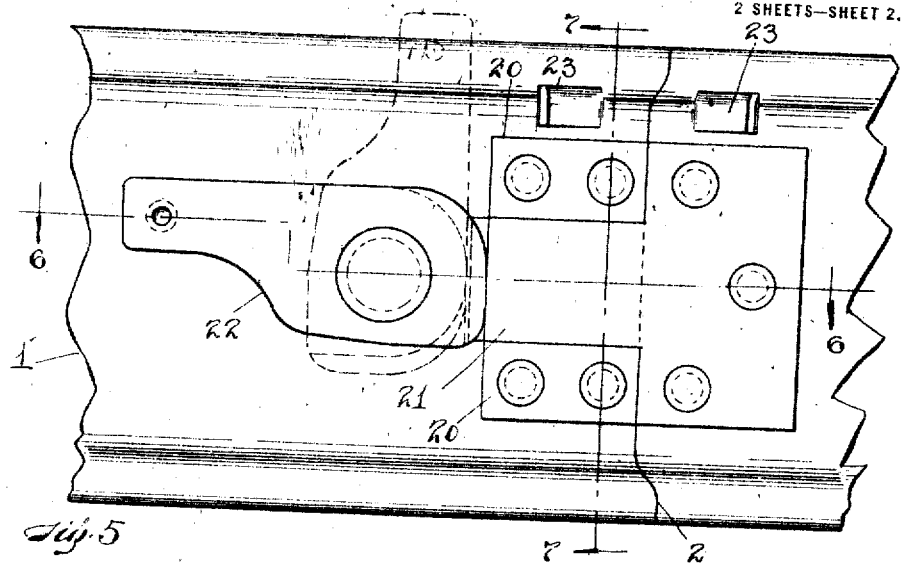

JOHN C. MANTERNACH AND CHARLES W. GRESSLE, OF CLEVELAND, OHIO, ASSIGNORS, BY MESNE ASSIGNMENTS, TO THE STANDARD PARTS COMPANY, OF CLEVELAND, OHIO, A CORPORATION OF OHIO.

WHEEL WITH DEMOUNTABLE RIM.

1,351,183.      Specification of Letters Patent.     Patented Aug. 31, 1920.

Application filed June 1, 1916. Serial No. 101,013.

*To all whom it may concern:*

Be it known that we, JOHN C. MANTERNACH and CHARLES W. GRESSLE, citizens of the United States, and residents of Cleveland, county of Cuyahoga, State of Ohio, have jointly invented a new and useful Improvement in Wheels with Demountable Rims, of which the following is a specification, the principle of the invention being herein explained and the best mode in which we have contemplated applying that principle, so as to distinguish it from other inventions.

In utilizing demountable rims with securing means consisting of devices that exert a radially inward pull on the rim, in contradistinction to devices that exert a radially outward wedging action, we have found that where such rims are trans-split various changes and improvements can be advantageously made also in the means for locking the trans-split rim-ends together. The object of the present invention, accordingly is to provide means for this purpose which are especially adapted for use in connection with securing means of the class described, although not necessarily limited thereto, whereby such rim-ends may be effectively locked together, when the rim is in use on the wheel, but which will permit of the ready separation of the ends when the rim is demounted. To the accomplishment of the foregoing and related objects, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is an elevation of a portion of a wheel and rim, the latter incorporating our present improved rim-end locking means; Fig. 2 is a transverse section through the wheel-felly and rim, showing such locking means, the plane of the section being indicated by the line 2—2, Fig. 1; Fig. 3 is a bottom plan view of the rim by itself, also showing such locking means; Fig. 4 is a sectional view of the same, the plane of the section being indicated by the line 4—4, Fig. 2; Fig. 5 is a bottom plan view similar to that of Fig. 3, but illustrating certain modifications in construction; Fig. 6 is a longitudinal sectional view of such modified construction, the plane of the section being indicated by the line 6—6, Fig. 5; Fig. 7 is a transverse sectional view thereof, as indicated by the line 7—7, Fig. 5; while Figs. 8 and 9 are sectional views of details of the same modified construction.

The form of demountable rim 1 illustrated is a modification of the so-called Continental type rim, being trans-split at one point 2 in its circumference, so as to permit the rim to be collapsed in order to remove a damaged tire therefrom or place a fresh tire thereon, as need not be further explained. As indicated, such rim is further modified to adapt it to be demountably secured on to the wheel body in a different manner from that ordinarily used with rims of the general type in question.

In other words, while the rear edge of the rim is adapted to seat on an inclined flange 3 bent radially outward from the corresponding edge of the felly-band 4, instead of introducing a plurality of wedges in circumferentially spaced relation between the front edge of the rim and the wheel body, thereby placing the rim under tension by reason of the outward component of the force exerted by the several wedges, we utilize a series of clamps 5, the action of which is to draw radially inwardly upon the rim. Preferably these clamps take on the form of plates having their respective upper and lower ends 6 and 7 bent inwardly at an obtuse angle to the body of the clamp, such upper inwardly bent ends 6 being adapted to engage with the correspondingly beveled, outwardly directed edges of plates 8 fixedly attached to the inner face of the rim, while such lower, inwardly bent ends 7 are adapted to engage correspondingly beveled edges on plates 9 fixedly attached to the front face of the felly, and so constituting in effect an integral part of the wheel body.

The use of devices of the above described type for securing the rim in place on the wheel body, obviously will tend to force together the ends of the rim if it be of the trans-split type, rather than to pull such ends apart, as in prevailing constructions. Accordingly, it no longer becomes necessary to provide means for positively connecting such rim-ends so as to hold them non-adjustably together. Furthermore, a maximum tolerance may be left in the rim as manufactured, inasmuch as the space between the rim-ends will be decreased and not increased when the rim is in service.

In order to insure the proper alinement, however, of the rim-ends, and to provide adequate means for holding them together when the rim is carried as a spare with an inflated tire thereon, as also to assist the contracting effect of the clamp plates described above, we preferably utilize the rim-end locking means, one form of which is shown in Figs. 2, 3, and 4. As there shown, such means will be seen to consist of two plates 10 and 11 riveted or otherwise fixedly secured to the inner face of the rim, one adjacent each side of the split. The one such plate 10 is cut away or recessed at 12, and the other has a projecting tongue 13 adapted to fit in such recess so as to retain the rim-ends in proper alinement laterally, without, however, interfering with their relative longitudinal movement, that is movement in a circumferential direction. So, too, the ends are left free to be separated in a radial direction in case it is desired to contract the rim for the purpose previously indicated.

The front edges 14 of both of these locking plates 10 and 11 are extended forwardly and beveled so as to be utilized in conjunction with one of the clamping plates previously referred to. The upper inwardly bent end 6 of such clamp, bridges the joint between the plates, and so serves to pull radially inwardly on both of the same, thus firmly securing the outer edge of the rim, at the point where it is split, to the wheel body, and practically eliminating all play at this point.

This desirable result is further assisted by providing the rear edges of these same locking plates with complementary extensions 15 having their lateral edges beveled as best shown in Figs. 3 and 4, the adjacent portion of the flange on the felly-band being slotted at 16 to receive these extensions, when in properly fitted relation. The respective laterally beveled edges of these plates are designed to engage with the end walls of the slot, so that, as the rim is forced back in seated position on the flange, the plates are forced together, thus drawing the ends of the rim likewise forcibly together.

If desired, as indicated in Fig. 2, the upper edge of the slot 16 may be rounded or beveled, slightly, so that the effect of the engagement of the extensions 15 on the plates therewith will be to force such plates radially inwardly, as well as to bring them together in a circumferential direction.

In the modification illustrated in Fig. 5, instead of having the plate which receives the tongue an integral plate with a recess for the purpose like plate 10, two separate plates 20 are provided, between which the tongue 21, slightly modified in form, may extend and be held in exactly the same fashion as before. In order, however, to prevent the inadvertent separation of the rim-ends in a radial direction, a latch 22 is provided, being pivotally mounted on the rim-end carrying the two plates 20, and being formed to engage the extremity of said tongue 21 in one position, as shown in full lines in Fig. 5, or to release such tongue as shown in dotted outline in the same figure, as desired.

The plates in this construction, furthermore, are shown without either the forward beveled extensions or the rearward flange-engaging extensions of those first-described. Instead of the latter, equivalent means for pulling the rim-ends together, as well as forcing them radially inwardly so as to insure against their relative movement, when the rim is once seated, are provided, such means comprising beveled lugs 23 struck up from the material of the rim itself, one adjacent each end. These lugs, as best shown in Figs. 8 and 9, extend downwardly and incline both in a circumferential direction and rearwardly. Accordingly, when they are brought into engagement, as the rim is seated on the flange 3 of the felly-band 4, with properly disposed slots 24 in such flange, the effect of such engagement is, as stated, both to draw the rim-ends together and to pull them radially inwardly, thus effectively tying the structure together.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. The combination with a wheel body; of a demountable rim therefor of the transversely split type, movable laterally onto and off from said wheel body; interfitting plates on the respective ends of said rim adapted to lock the same against relative lateral movement; and means on said wheel body adapted to engage said plates to draw the same, and thereby such rim-ends, together as said rim is placed in position on said wheel body.

2. A device for securing a demountable rim of the transversely split type on a wheel body, said device including interfitting plates on the respective ends of said rim adapted to lock the same against relative lateral movement, the front edges of said plates being beveled; and a side clamp on said wheel body for securing said rim in position thereon, said clamp bridging the split in said rim and having a beveled portion adapted to coöperate with such beveled edges of said plates to pull radially inwardly upon the same and thus upon such rim-ends.

3. A device for securing a demountable rim of the transversely split type on a wheel body, said wheel body having a flange on its rear edge and said rim being adapted, when in position on said wheel body, to seat against such flange, said device including interfitting plates on the respective ends of said rim adapted to lock the same against relative lateral movement, said plates having rearward extensions and such flange being formed with a slot adapted to engage such extensions and thereby draw said plates and rim-ends together, as said rim is placed in position on said wheel body.

4. A device for securing a demountable rim of the transversely split type on a wheel body, said wheel body having a flange on its rear edge and said rim being adapted, when in position on said wheel body, to seat against such flange, said device including interfitting plates on the respective ends of said rim adapted to lock the same against relative lateral movement, said plates having laterally beveled rearward extensions and such flange being formed with a slot adapted to engage such extensions and thereby draw said plates and rim-ends together, as said rim is placed in position on said wheel body.

5. A device for securing a demountable rim of the transversely split type on a wheel body, said wheel body having a flange on its rear edge and said rim being adapted, when in position on said wheel body, to seat against such flange, said device including interfitting plates on the respective ends of said rim adapted to lock the same against relative lateral movement, said plates having laterally beveled rearward extensions and such flange being formed with a slot adapted to engage such extensions and thereby draw said plates and rim-ends together, as said rim is placed in position on said wheel body, the upper edge of such slot being beveled so as to draw said plates and rim-ends radially inward at the same time.

6. A device for securing a demountable rim of the transversely split type on a wheel body, said wheel body having a flange on its rear edge and said rim being adapted, when in position on said body, to seat against such flange, said device including interfitting plates on the respective ends of said rim adapted to lock the same against relative lateral movement, the front edges of said plates being beveled and said plates having rearward extensions; and a clamp on said wheel body for securing said rim in position thereon, said clamp bridging the split in said rim and having a beveled portion adapted to coöperate with such beveled edges of said plates to pull radially inwardly upon the same and thus upon such rim-ends, and such flange being formed with a slot adapted to engage the rearward extensions on said plates and thereby draw said plates and rim-ends together, as said rim is placed in position on said wheel body.

Signed by us, this 24 day of May, 1916.
JOHN C. MANTERNACH.
CHARLES W. GRESSLE.

Attested by:—
C. D. SMITH,
VELMA L. WILLIAMS.